United States Patent [19]
Roehrick

[11] 4,133,024
[45] Jan. 2, 1979

[54] BEHIND THE SCENE LIGHTS

[76] Inventor: Otto A. Roehrick, 1333 Elk Horn Blvd., Rio Linda, Calif. 95673

[21] Appl. No.: 664,757

[22] Filed: Mar. 8, 1976

[51] Int. Cl.² .................. F21V 33/00; A01K 63/00
[52] U.S. Cl. ................................ 362/101; 119/5
[58] Field of Search .............. 240/2 LC, 10 P, 2 AD, 240/10 R, 6, 103 R; 428/13, 14; 40/132 R; 272/9, 10; 47/69; 119/5; 362/101

[56] References Cited

U.S. PATENT DOCUMENTS

| | | | |
|---|---|---|---|
| 1,681,040 | 8/1928 | Kemp | 240/2 LC |
| 1,777,944 | 10/1930 | Trovato | 362/101 X |
| 1,974,068 | 10/1934 | Greensaft | 240/2 LC X |
| 2,107,641 | 2/1938 | Malcomson | 240/10 R X |
| 2,269,718 | 1/1942 | Huber | 40/132 R |
| 2,352,361 | 6/1944 | Ballestero | 240/10 R |
| 2,415,514 | 2/1947 | Mayes | 240/10 R |
| 2,814,895 | 12/1957 | Flam | 428/14 X |
| 2,821,621 | 1/1958 | Allunario | 240/2 AD X |
| 2,847,973 | 8/1958 | Pugh | 119/5 |
| 3,269,578 | 8/1966 | Leirs | 47/1 X |
| 3,730,138 | 5/1973 | Suchowski | 119/5 |
| 3,749,901 | 7/1973 | Clough | 240/2 LC |
| 3,908,598 | 9/1975 | Jewson | 240/2 LC |

FOREIGN PATENT DOCUMENTS

| | | | |
|---|---|---|---|
| 1127253 | 8/1956 | France | 119/5 |
| 1333664 | 9/1962 | France | 428/13 |
| 535526 | 4/1941 | United Kingdom | 119/5 |
| 666976 | 2/1952 | United Kingdom | 240/10 R |
| 1024047 | 3/1966 | United Kingdom | 240/10 R |

*Primary Examiner*—Donald A. Griffin

[57] ABSTRACT

A light source for a container of the transparent variety, all sides being transparent, principally used for the simultaneous display of aquius and terranius culture. However, also adaptable to aquariums and terrariums in separate forms consisting of a lighted background simply placed and hung in the fashion of a hood but afixed to the backside of the container instead of the top.

3 Claims, 5 Drawing Figures

BEHIND THE SCENE LIGHTS

BACKGROUND OF THE INVENTION

To my knowledge there have been no means provided to beneficially light a transparent container simultaneously having a terranius and aquius area with a horizontal division. I have invented the Ecolarium, a container in which I attempt to include as much as possible of the living ecological balance and the scenic wonders of the world for home viewing. For this reason I designed the Behind the Scenes Light, which, I could have called the behind the container light or background light or behind the scene hood.

SUMMARY OF THE INVENTION

This invention relates to a container, preferably a transparent container, for the ornamental display of aquius life and/or terranius life and more precisely a means of lighting said container.

By having light come from the backside of the container the lower aquius area and the upper terranius area may be simultaneously lighted and the effects of said lighting giving benefits and effects heretofore unavailable to the aquarist, terranist, or ecolarist.

The advantages of using a Behind the Scenes Light, as I have invented is its simplicity for changing bulbs and its safety and beauty value. There is no loss of front or side viewing area, There is no danger of it falling into the water, thus eliminating electrical shocks. No corrosion problems since there is no moisture condensing on the socket. Because heat rises there is absolutely no danger of broken glass. Since the normal placement of objects in a container are at the top, backside, and the bottom back corners the bulbs would under normal conditions be hidden from view.

The hobbiest can create his own unique designs by the way he places objects in front of the light in the container.

By looking at the drawings one will see how this is done.

FIG. 1 is a perspective drawing of an Ecolarium with the preferred Behind the Scenes Light wherein
1 is the aquius viewing area,
2 the terranius viewing area, #3 the light source,
4 the sky area above and behind the terranius area,
5 the cave-like area between the shelf supports, #6 the light rays entering the aquius area from light #3,
7 the water return cut out in the terranius shelf,
8 the light rays from light #3 entering the sky area, and
10 the hanging brackets, its own weight holds it to the container.

Figure 2:
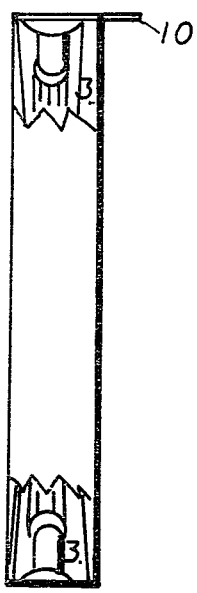
FIG. 2 is a rectangular Behind the Scenes Light with a horizontal mounting to the light at the bottom and the top.
Figure 4:
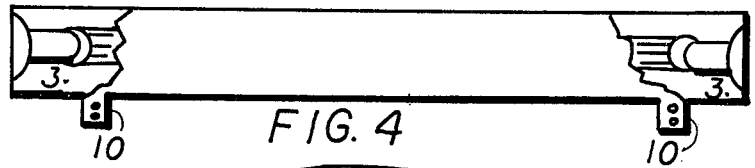
FIG. 4 is a Behind the Scenes Light with a vertical light mounted at each end.
Figure 3:
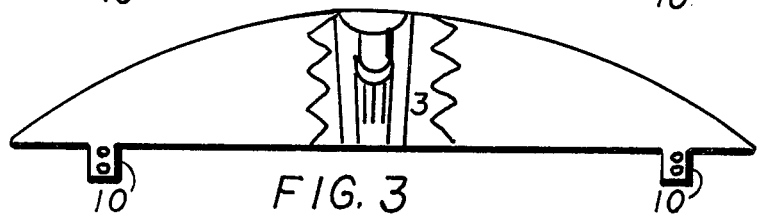
FIG. 3 is a Behind the Scene Light concaved and lighted with a vertical installation.
Figure 1:
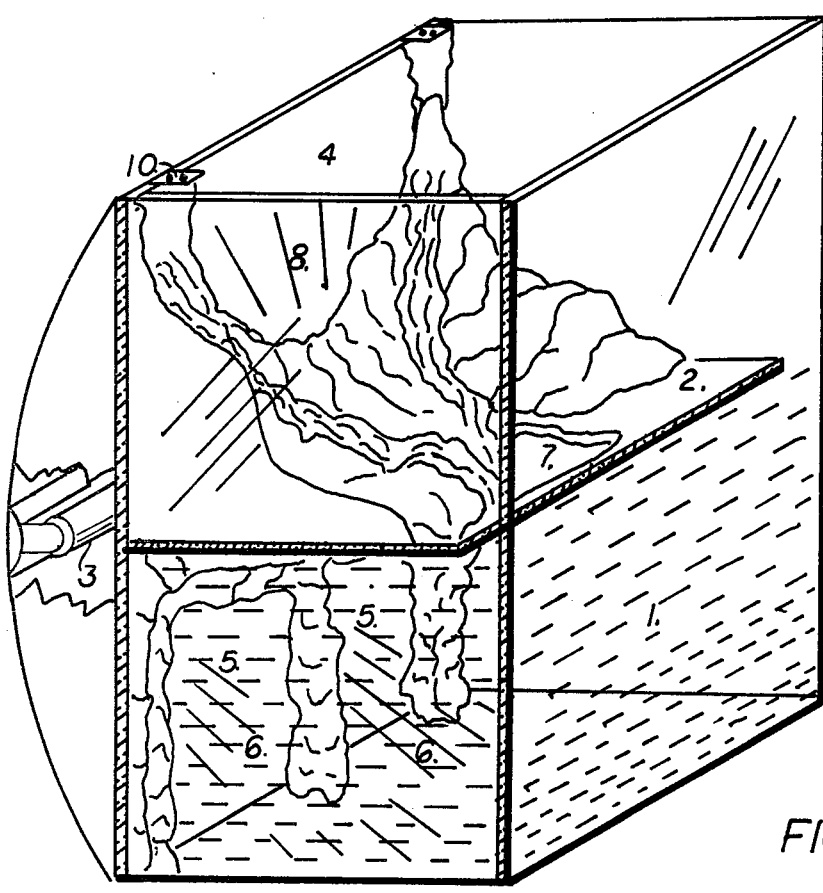
Figure 5:
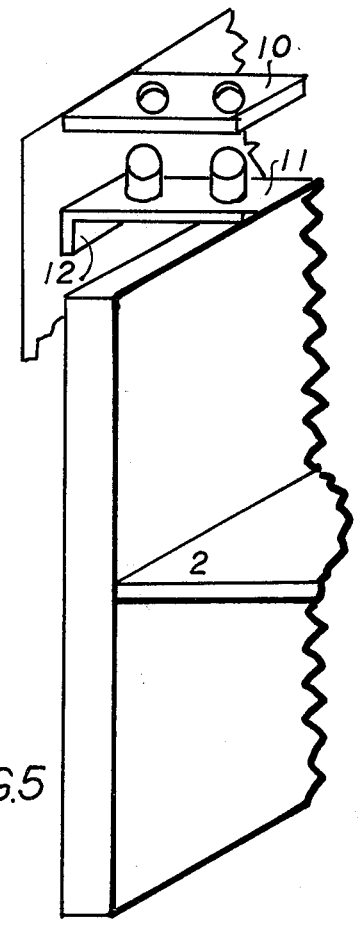
FIG. 5 is a standing Ecolarium shelf showing a hanging bracket #10 attached to the Behind the Scene Light and supporting bracket #11 with attaching hook #12 prior to securing of the hook #12 to the inside wall of the Ecolarium shelf.

What is claimed is:

1. In combination, an Ecolarium (ecology tank), a lower aquis portion and an upper sky and terranius portion, a background like horizontally concaved cover forming a concaved arch; a light source mounted in the center of said arch; said cover being fitted on the backside of said Ecolarium, the light rays from said source shining simultaneously downward into the portion of the aquis and upward into the sky and terranius area.

2. A cover as in claim 1 having a vertical concaved arch; a light source mounted in the center of said vertical arch.

3. A background-like hood as in claim 1 for an aquarium-like container having at least one light source for illumination of said aquarium-like container.

* * * * *